(12) United States Patent
Ravi et al.

(10) Patent No.: US 8,893,103 B2
(45) Date of Patent: Nov. 18, 2014

(54) AUTOMATIC ASYNCHRONOUS OFFLOAD TO MANY-CORE COPROCESSORS

(71) Applicant: NEC Laboratories America, Inc., Princeton, NJ (US)

(72) Inventors: Nishkam Ravi, Lawrenceville, NJ (US); Yi Yang, Edison, NJ (US); Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 18 days.

(21) Appl. No.: 13/940,974

(22) Filed: Jul. 12, 2013

(65) Prior Publication Data

US 2014/0053131 A1    Feb. 20, 2014

Related U.S. Application Data

(60) Provisional application No. 61/683,782, filed on Aug. 16, 2012.

(51) Int. Cl.
*G06F 9/45* (2006.01)
*G06F 9/44* (2006.01)
*G06F 9/50* (2006.01)

(52) U.S. Cl.
CPC ............... *G06F 8/33* (2013.01); *G06F 8/4441* (2013.01); *G06F 8/452* (2013.01); *G06F 9/5027* (2013.01); *G06F 2209/509* (2013.01)
USPC ............................ 717/160; 717/151; 717/159

(58) Field of Classification Search
CPC ......... G06F 8/33; G06F 8/443; G06F 8/4441; G06F 8/452; G06F 9/46; G06F 9/5027; G06F 2209/509

USPC .................................. 717/110–113, 151–161
See application file for complete search history.

(56) References Cited

U.S. PATENT DOCUMENTS

| | | | | |
|---|---|---|---|---|
| 8,046,745 | B2* | 10/2011 | Wong | 717/130 |
| 8,214,818 | B2* | 7/2012 | Liu et al. | 717/160 |
| 8,793,675 | B2* | 7/2014 | Lin et al. | 717/160 |
| 2008/0134150 | A1* | 6/2008 | Wong | 717/130 |
| 2009/0064120 | A1* | 3/2009 | Liu et al. | 717/160 |
| 2012/0167069 | A1* | 6/2012 | Lin et al. | 717/160 |
| 2013/0232476 | A1* | 9/2013 | Varma et al. | 717/150 |

OTHER PUBLICATIONS

Koesterke et al., "Early Experiences with the Intel Many Integrated Cores Accelerated Computing Technology," Jul. 2011, ACM.*

(Continued)

*Primary Examiner* — Qing Chen
(74) *Attorney, Agent, or Firm* — Joseph Kolodka

(57) ABSTRACT

Methods and systems for asynchronous offload to many-core coprocessors include splitting a loop in an input source code into a sampling sub-part, a many integrated core (MIC) sub-part, and a central processing unit (CPU) sub-part; executing the sampling sub-part with a processor to determine loop characteristics including memory- and processor-operations executed by the loop; identifying optimal split boundaries based on the loop characteristics such that the MIC sub-part will complete in a same amount of time when executed on a MIC processor as the CPU sub-part will take when executed on a CPU; and modifying the input source code to split the loop at the identified boundaries, such that the MIC sub-part is executed on a MIC processor and the CPU sub-part is concurrently executed on a CPU.

14 Claims, 3 Drawing Sheets

(56) References Cited

OTHER PUBLICATIONS

Ravi et al., "Apricot: An Optimizing Compiler and Productivity Tool for x86-compatible Many-core Coprocessors," Jun. 2012, ACM, p. 47-57.*

Stanzione et al., "Preparing for Stampede: Programming Heterogeneous Many-Core Supercomputers," Jul. 16, 2012, XSEDE 12, p. 1-30.*

Agarwal, A., et al. "Automatic partitioning of parallel loops and data arrays for distributed shared-memory multiprocessors" IEEE Transactions on Parallel and Distributive Systems, vol. 6, No. 9. Sep. 1995. pp. 943-962.

Baskaran, M., et al. "Automatic C-to-CUDA Code Generation for Affine Programs" CC'10/ETAPS'10 Proceedings of the 19th joint European conference on Theory and Practice of Software, international conference on Compiler Construction. Mar. 2010. pp. 244-263.

Barua, R., et al. "Communication-minimal partitioning of parallel loops and data arrays for cache-coherent distributed-memory multiprocessors" Languages and Compilers for Parallel Computing, 9th International Workshop, LCPC'96. Aug. 1996. pp. 350-368.

Lee, S., et al. "OpenMP to GPGPU: A compiler framework for automatic translation and optimization" Proceedings of the 14th ACM SIGPLAN Symposium on Principles and Practice of Parallel Programming, PPOPP 2009. Feb. 2009. pp. 101-110.

* cited by examiner

AUTOMATIC ASYNCHRONOUS OFFLOAD TO MANY-CORE COPROCESSORS

RELATED APPLICATION INFORMATION

This application claims priority to provisional application Ser. No. 61/683,782, filed on Aug. 16, 2012, incorporated herein by reference.

BACKGROUND

1. Technical Field

The present invention relates to parallel processing and, in particular, to automatically offloading processing to a multi-processor while maintaining the use of a primary processor.

2. Description of the Related Art

The Many Integrated Core (MIC) architecture is an x86-compatible, many-core co-processor aimed at accelerating applications written for multi-core processors. Parallel code regions are offloaded to MIC for execution using, e.g., #pragma directives. When a code region is offloaded, execution on the CPU is suspended until the offloaded code section executes to completion.

In the most common usage model, highly parallel code regions in an application are offloaded to MIC. The developer identifies and marks such code regions using a directive called #pragma offload. Data transfers between the host and coprocessor are specified using in/out/inout clauses. The goal of MIC is to improve overall application performance by taking advantage of higher number of cores. Although MIC is a step forward in terms of programmability compared to GPUs, a certain amount of developer effort is needed to obtain good performance gains.

SUMMARY

A method for code modification includes splitting a loop in an input source code into a sampling sub-part, a many integrated core (MIC) sub-part, and a central processing unit (CPU) sub-part; executing the sampling sub-part with a processor to determine loop characteristics including memory- and processor-operations executed by the loop; identifying optimal split boundaries based on the loop characteristics such that the MIC sub-part will complete in a same amount of time when executed on a MIC processor as the CPU sub-part will take when executed on a CPU; and modifying the input source code to split the loop at the identified boundaries, such that the MIC sub-part is executed on a MIC processor and the CPU sub-part is concurrently executed on a CPU.

A system for code modification includes a processor configured to split a loop in an input source code into a sampling sub-part, a MIC sub-part, and a CPU sub-part; a loop sampling module configured to executing the sampling sub-part with a processor to determine loop characteristics including memory- and processor-operations executed by the loop and to identifying optimal split boundaries based on the loop characteristics such that the MIC sub-part will complete in a same amount of time when executed on a MIC processor as the CPU sub-part will take when executed on a CPU; and a code modifying module configured to modify the input source code to split the loop at the identified boundaries, such that the MIC sub-part is executed on a MIC processor and the CPU sub-part is concurrently executed on a CPU.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

When a code region is offloaded to a Many Integrated Core (MIC) processor, execution on the central processing unit (CPU) is suspended until the offloaded code region executes to completion. To offload code to MIC asynchronously without suspending CPU execution, signal and wait clauses are used. When the signal clause is used along with #pragma offload, the following code region is offloaded to MIC, dispatched for execution, and the control is returned back to the CPU immediately. The code on the CPU side continues to execute till a wait clause is encountered. The CPU blocks on the wait until the offloaded code region executes to completion. For asynchronous offload to be profitable, the CPU should have enough work to do while the offloaded code region executes on MIC.

Figure 1:
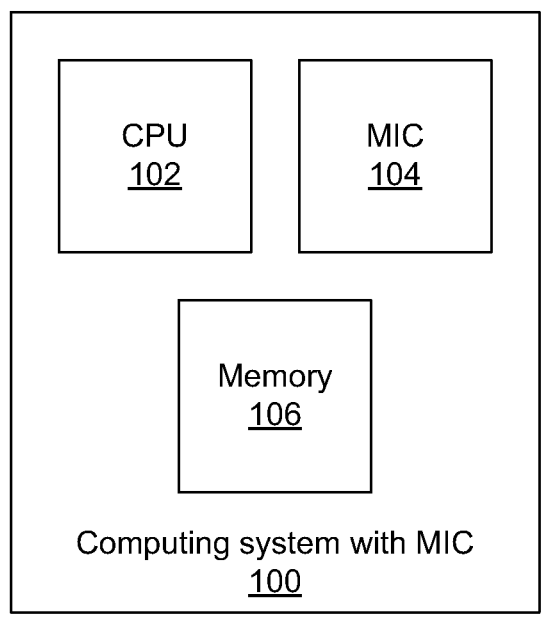
FIG. 1 is a diagram of a computing system having a many-core coprocessor in accordance with the present principles.

Referring now to the drawings in which like numerals represent the same or similar elements and initially to FIG. 1, a computing system 100 is shown. The system 100 includes a CPU 102 and one or more MIC processors 104, in communication with a memory 106. If a code region R1 is offloaded to MIC 104 and dispatched for execution, the CPU 102 goes on to execute a second code region R2 and then blocks on the wait clause. To execute code region R1 on MIC 104 concurrently with code region R2 on CPU 102 and obtain good performance, the developer has to make sure that (i) there are no dependencies between code regions R1 and R2, (ii) code region R1 is significant and parallel enough to benefit from executing on MIC 104, and (iii) the execution time of code region R1 on MIC 104 is close to the execution time of code region R2 on the CPU 102. This would require certain amount of effort on the part of the developer and a possible refactoring of the application.

Embodiments of the present invention provide a source-to-source compiler optimization for automating asynchronous offload and concurrent execution. Code regions R1 and R2 can be obtained automatically by splitting the index range of a hot parallel loop in two parts. The first sub-loop could be offloaded to MIC 104 while the second one executes on the CPU 102 in parallel. In this model, MIC 104 assists the CPU 102 in executing a hot parallel loop by sharing the load, thereby enabling true parallelism. For this transformation to be correct and profitable, a number of issues have to be taken care of. First, the split boundary should be selected in such a way that the time of execution of the first sub-loop R1 on MIC 104 is close to the execution time of the second sub-loop R2 on CPU 102. This even distribution of work ensures minimum idle time for both CPU 102 and MIC 104. Second, the transformation should be applied only if the speedup obtained by executing R1 on MIC 104 offsets the overheads of copying data into and out of MIC 104 from memory 106. Third, reduction variables and shared memory in critical sections should be handled correctly. A "critical section," as that term is used herein, is a portion of code that is executed simultaneously by two or more parallel tasks, threads, or processes, and that updates a variable that is common to the parallel tasks, threads, or processes.

Figure 2:
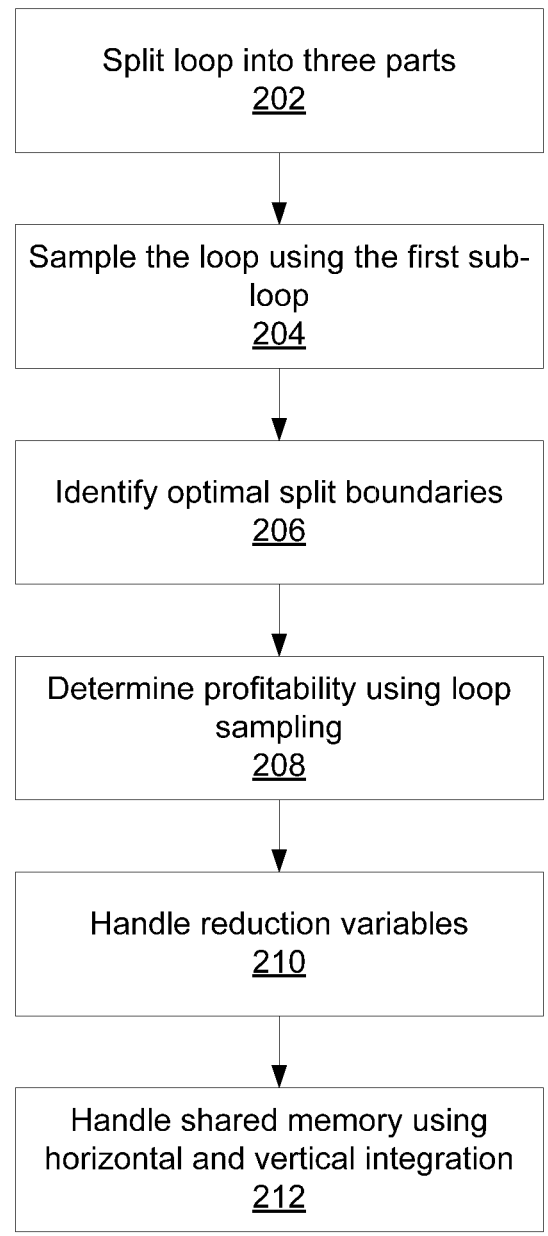
FIG. 2 is a block/flow diagram of a method for offloading computing to a many-core coprocessor in accordance with the present principles.
Figure 3:
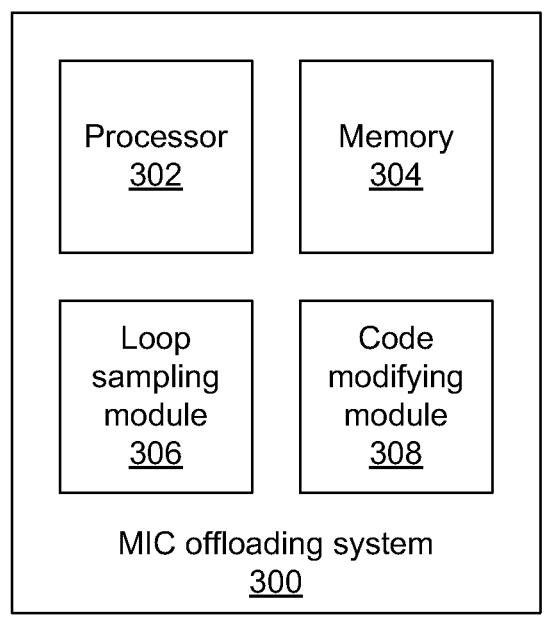
FIG. 3 is a diagram of a system for offloading computing to a many-core coprocessor in accordance with the present principles.

Referring now to FIG. 2, a method for automating asynchronous offload is shown. For a given parallelizable loop, block 202 splits the loop into three parts: a sample sub-loop, a MIC sub-loop, and a CPU sub-loop. So, for a loop that has an index running from 1 to N, the index range is split into sub-ranges of $(1, c_1)$, $(c_1+1, c_2)$, and $(c_2+1, N)$. The code for the original loop is copied into each of the new loops. Block 204 runs the sample sub-loop to characterize the loop, generating information that will be used to judge the profitability of the transformation. The first split boundary, $c_1$, should be relatively small, so as to provide the information needed without sacrificing too much of the parallelization.

Block 206 identifies the optimal split boundary $c_2$ by estimating a ratio of the execution time of an iteration on MIC 104 to the execution time of an iteration on CPU 102. If, for example, the iteration takes twice as long to execute on CPU 102 as it does on MIC 104, then the index range of the MIC sub-loop should be roughly twice the index range of the CPU sub-loop, such that both sub-loops finish execution at roughly the same time. This leads to:

$$r = (N - c_2)/(c_2 - c_1) = t_{MIC}/t_{CPU}$$

$$c_2 = (N + r \cdot c_1)/(1 + r),$$

Where $t_{MIC}$ and $t_{CPU}$ are the execution times for the MIC and CPU sub-loops respectively. The body of the loop may be statically analyzed to provide an estimate of the number of CPU operations and number of memory operations the body of the loop uses. Since the loop may contain inner loops with non-constant upper bounds, values for the numbers of operations are generated as functions of inner loop iterations and are given values at runtime.

As an example, block 206 may take the following code:

```
int f (...) {
    ...
    #pragma offload
    in (...) out (...)
    {
        #pragma omp parallel for
        /* hot loop */
        for ( i =0; i < N; i++){
            A[ i ] = B[ i ] * C[ i ];
            ...
        }
    }
    ...
}
```

Block 206 may then produce code such as:

```
int f (...) {
    ...
    gettime (&t1 ) ;
    /* sample loop ( c1 < 10) */
    for ( i =0; i < c1 ; i++) {
        A[ i ] = B[ i ] *C[ i ];
        ...
    }
    gettime (&t2 ) ;
```

```
    t_cpu = diff ( t2 , t1 ) ;
    r = K * (mem_ops/ cpu_ops ) ;
    c2 = (N + c1 * r)/(1 + r) ;
    if ( cost_model ( t_cpu, dsize, r_d , c1, c2 ){
        /* MIC loop */
        #pragma offload target (MIC) in ( . . ) out ( . . )
        signal (&f );
        {
            #pragma omp parallel for
            f o r ( i=c1 ; i < c2 ; i++){
                A[ i ] = B[ i ] * C[ i ] ;
                ...
            }
        }
        /*CPU loop */
        #pragma omp parallel for
        f o r ( i=c2 ; i < N; i++){
            A[ i ] = B[ i ] * C[ i ] ;
            ...
        }
        #pragma offload_wait target (MIC) wait(&f )
        { }
    } e l s e {
        #pragma omp parallel for
        f o r ( i=c1 ; i < N; i++){
            A[ i ] = B[ i ] * C[ i ] ;
            ...
        }
    }
}
```

The execution time of a loop iteration on MIC 104 is a function of the execution time on CPU 102 and the ratio of memory operations to CPU operations. MIC 104 does better for computationally intensive code, such that the execution time on MIC 104 to CPU 102 is roughly proportional to the ratio of memory operations to CPU operations:

$$r = t_{MIC}/t_{CPU} = f(K(\text{mem\_ops/cpu\_ops})),$$

Where K is an empirically obtained normalization factor.

Code for obtaining the value of r and $c_2$ is inserted in the source code as part of the transformation. This is because $c_2$ is obtained from the actual runtime memory operations and CPU operations. This transformation is applied to loops marked by #pragma omp parallel for that take at least 10% of the total time of execution.

Block 208 determines the profitability of the transformation by ensuring that the time taken to copy data into and out of the MIC 104 for the MIC sub-loop is offset by the gains obtained from concurrent execution. Assuming that the MIC sub-loop executes in parallel with the CPU sub-loop, the total execution time is equal to: (execution time of sample loop+ data transfer time for MIC loop+execution time of CPU loop). Let dsize be the total size of the data variables that need to be copied into and out of MIC 104 for offload and let $r_d$ be the data transfer rate. The total execution time is given by:

$$\frac{t_{cpu} \cdot c_1 + dsize}{r_d} + t_{cpu}(N - c_2).$$

The execution time of the original unmodified loop is given by $t_{cpu} \cdot N$. For this transformation to be profitable, the execution time of the transformed code should be less than that of the original code. This is the cost model function for this transformation. An "if" condition is inserted before the MIC saub-loop to invoke the cost model function. The then-branch contains the MIC sub-loop and the CPU sub-loop. The else-branch contains the original loop (with index range $(c_1, N)$).

The value of dsize is obtained by adding up the size of the data variables specified in the in/out/inout clauses for MIC sub-loop. The value of $r_d$ (which is a constant) is obtained experimentally.

The value of $t_{cpu}$ is obtained using loop sampling. Timestamps ($t_1$ and $t_2$) are inserted before and after the sample loop. The value of $t_{cpu}$ is obtained at runtime from the two timestamps:

$$t_{cpu} = \frac{t_2 - t_1}{c_1}.$$

The sample loop is created to obtain the value of $t_{cpu}$, which would otherwise have to be estimated using static analysis. This allows a handful of iterations of a loop (in the form of a sample loop) to be used to accurately estimate the execution time of one loop iteration at runtime. This approach can be used by other cost models as well (e.g auto-parallelization). The value of $t_{cpu}$ obtained in block 208 is a close approximation to the actual value of $t_{cpu}$, since data locality and cache behavior can change.

Block 210 handles reduction variables. If a parallel loop does not contain reduction variables or critical sections, no variable renaming is necessary while splitting the loop. When there are no loop carried dependencies (and hence no order of execution among the iterations) in the original loop, the MIC and CPU sub-loops can execute in parallel and perform read and write operations on private as well as shared memory. However, in the presence of reduction variables and/or critical sections, additional work needs to be done to ensure correctness.

Given a reduction variable v and reduction operation L in the original loop, a new variable $v_{mic}$ is generated and block 210 replaces all occurrences of v by $v_{mic}$ in the MIC sub-loop. Code for computing $v=v \oplus v_{mic}$ after the CPU sub-loop is generated. An example of such a transformation is shown below. The reduction variables and corresponding operators are identified from a #pragma omp clause. The original code may be, for example:

```
#pragma omp parallel for reduction(+:v)
for(i=0; i < N; i++){
    ...
    v += A[i];
    ...
}
```

Whereas a transformed version of this code may be:

```
...
if (async_cbf(..)) {
    v_mic = v;
    /* MIC loop */
    #pragma offload target(mic)..inout(v_mic) signal(&f)
    {
        #pragma omp parallel for reduction(+:v_mic)
        for(i=c1; i < c2; i++){
            ...
            v_mic += A[i];
            ...
        }
    }
    /* CPU loop */
    #pragma omp parallel for reduction(+:v)
    for(i=c2; i < N; i++){
        ...
        v += A[i];
        ...
    }
```

```
    #pragma offload_wait target(mic) wait(&f)
    { }
    v += v_mic;
} else {
    ...
}
```

A critical section is defined for the purpose of updating shared memory that must not be concurrently accessed by more than one thread. If two loops are executed in parallel, and each loop has a separate runtime, the semantics of a critical section are violated. The following code shows a parallel loop:

```
#pragma omp critical
{
    for (j = 0; j < NQ; j++)
        q[j] += qq[j];
}
```

Shared array q is updated inside a critical section. Since the two sub-loops have separate copies of array q, they would both update their own copies. However, when the MIC sub-loop finishes, its copy of array q would be copied back to the host memory in the same location as the CPU sub-loop's q. As a result, the updates from one of the two loops would be lost (depending on which of the two loops finishes first).

To preserve the semantics of a critical section, (i) shared memory variables being accessed in the critical section need to be renamed, and (ii) code for merging the updates from the two loops needs to be added.

For each #pragma omp critical section, block 210 identifies the shared memory variables being updated in the critical section. This may be accomplished done with the help of, for example a compiler's memory tag infrastructure, which keeps track of read and write operations to all memory locations. Given a shared memory variable smv, a new variable $smv_{mic}$ is generated and all occurrences of smv are replaced by $smv_{mic}$ in the MIC sub-loop. To generate code for merging $smv_{mic}$ and smv, block 210 identifies the correct merge logic. In the case of reduction variables, merging is trivial. This is because the reduction operator is known and the merge logic is to simply apply the reduction operator to the two scalar variables. This is not the case for shared memory variables in critical sections.

Block 212 handles shared memory by employing horizontal and vertical integration. Careful analysis reveals that updates to shared memory (from two different processes) can be merged in most cases using either a horizontal integration approach, a vertical integration approach, or both. Consider two non-overlapping memory regions smv and $smv_{mic}$ of same or different lengths. Intuitively speaking, in horizontal integration, the two memory regions are merged by placing one on top of the other. The values smv[i] and $smv_{mic}$[i] are combined using a merge operator a (such as addition, multiplication, etc). The merge operator is identified by statically analyzing the code in the critical section. The following code may be generated for horizontal integration:

```
for(i=0; i < length(smv); i++){
    smv[i] = smv[i] o smv_mic[i];
}
```

Horizontal integration is used when the code in the critical section modifies the value of a shared memory location using an update operator, as in the case shown in the #pragma omp critical code above. The update operator in this case is +, which can be identified by parsing the code in the critical section using a set of heuristics. One exemplary heuristic is to look for both read and write to the same memory location.

In vertical integration, the two memory regions are merged by appending one to the other. Vertical integration is used when the code in the critical section modifies the value of a memory location without using an update operator. In other words, the value assigned to the memory location is not based on the previous value of the memory location. This typically corresponds to pointer operations, as in the case of dynamically allocated data structures, such as linked lists. The following code may be generated for vertical integration:

```
for(i=0; i < current length(smv mic); i++){
    smv[current length(smv) + i] = smv mic[i];
}
current length(smv) += current length(smc mic);
```

In this case, the original loop being split is parallel and hence does not carry any loop carried dependencies. This imposes restrictions on how the memory locations are accessed/updated inside the loop.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a system and method for automatic asynchronous offload (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for automating asynchronous offload to many-core coprocessors, comprising:
  splitting, by a processor, a parallelizable loop in an input source code into a sampling sub-loop, a many integrated core (MIC) sub-loop, and a central processing unit (CPU) sub-loop;
  executing, by the processor, the sampling sub-loop to determine loop characteristics including memory-operations and processor-operations executed by the parallelizable loop;
  identifying, by the processor, optimal split boundaries based on the loop characteristics such that the MIC sub-loop will complete in a same amount of time when executed on a MIC processor as the CPU sub-loop will take when executed on a CPU; and
  modifying, by the processor, the input source code to split the parallelizable loop at the identified optimal split boundaries, such that the MIC sub-loop is executed on a MIC processor and the CPU sub-loop is concurrently executed on a CPU.

2. The method of claim 1, wherein modifying the input source code further comprises:
  removing an original loop code block;
  adding a MIC loop code block that executes the original loop code block on the MIC processor; and
  adding a CPU loop code block that executes the original loop code block on the CPU.

3. The method of claim 2, wherein modifying the input source code further comprises inserting preprocessor MIC offloading statements.

4. The method of claim 1, wherein modifying the input source code further comprises handling reduction variables by replacing variable names in the MIC sub-loops and the CPU sub-loops to prevent conflicts.

5. The method of claim 1, wherein modifying the input source code further comprises handling shared memory in critical sections using horizontal integration and vertical integration.

6. The method of claim 5, wherein modifying the input source code further comprises performing the horizontal integration by overlapping memory regions.

7. The method of claim 5, wherein modifying the input source code further comprises performing the vertical integration by appending memory regions to one another.

8. A system for automating asynchronous offload to many-core coprocessors, comprising:
  a processor configured to split a parallelizable loop in an input source code into a sampling sub-loop, a many integrated core (MIC) sub-loop, and a central processing unit (CPU) sub-loop;
  a loop sampling module configured to execute the sampling sub-loop to determine loop characteristics including memory-operations and processor-operations executed by the parallelizable loop and to identify optimal split boundaries based on the loop characteristics such that the MIC sub-loop will complete in a same amount of time when executed on a MIC processor as the CPU sub-loop will take when executed on a CPU; and a code modifying module configured to modify the input source code to split the parallelizable loop at the identified optimal split boundaries, such that the MIC sub-loop is executed on a MIC processor and the CPU sub-loop is concurrently executed on a CPU.

9. The system of claim 8, wherein the code modifying module is further configured to remove an original loop code block, to add a MIC loop code block that executes the original loop code block on the MIC processor, and to add a CPU loop code block that executes the original loop code block on the CPU.

10. The system of claim 9, wherein the code modifying module is further configured to insert preprocessor MIC off-loading statements.

11. The system of claim 8, wherein the code modifying module is further configured to handle reduction variables by replacing variable names in the MIC sub-loops and the CPU sub-loops to prevent conflicts.

12. The system of claim 8, wherein the code modifying module is further configured to handle shared memory in critical sections using horizontal integration and vertical integration.

13. The system of claim 12, wherein the code modifying module is further configured to perform the horizontal integration by overlapping memory regions.

14. The system of claim 12, wherein the code modifying module is further configured to perform the vertical integration by appending memory regions to one another.

* * * * *